(12) United States Patent
Liu et al.

(10) Patent No.: US 7,606,596 B2
(45) Date of Patent: Oct. 20, 2009

(54) EXPLOITING MULTIUSER DIVERSITY THROUGH PHASE MODULATION MULTIPLEXING

(75) Inventors: Hui Liu, Sammamish, WA (US); Manyuan Shen, Bellevue, WA (US); Guanbin Xing, Bellevue, WA (US)

(73) Assignee: Adaptix, Inc., Carrollton, TX (US)

( * ) Notice: Subject to any disclaimer, the term of this patent is extended or adjusted under 35 U.S.C. 154(b) by 458 days.

(21) Appl. No.: 11/001,939

(22) Filed: Dec. 1, 2004

(65) Prior Publication Data

US 2006/0116077 A1    Jun. 1, 2006

(51) Int. Cl.
    *H04M 1/00*        (2006.01)
(52) U.S. Cl. .................. 455/561; 455/110; 375/302
(58) Field of Classification Search ............. 370/329, 370/330; 455/450–452.2, 110, 561; 375/295, 375/302, 242–254
    See application file for complete search history.

(56) References Cited

U.S. PATENT DOCUMENTS

| | | | |
|---|---|---|---|
| 5,715,459 A | 2/1998 | Celi, Jr. et al. | |
| 5,828,948 A * | 10/1998 | Almgren et al. | ............. 455/450 |
| 5,951,672 A | 9/1999 | Kwok et al. | |
| 5,966,412 A | 10/1999 | Ramaswamy | |
| 6,088,044 A | 7/2000 | Kwok et al. | |
| 6,295,273 B1 * | 9/2001 | Wakabayashi | ............... 370/215 |
| 6,502,097 B1 | 12/2002 | Chan et al. | |
| 6,606,499 B1 | 8/2003 | Verrier et al. | |
| 7,012,978 B2 * | 3/2006 | Talwar | ....................... 375/346 |
| 7,047,006 B2 * | 5/2006 | Classon et al. | .............. 455/434 |
| 2002/0150167 A1 * | 10/2002 | Demjanenko et al. | ........ 375/259 |
| 2003/0038798 A1 | 2/2003 | Besl et al. | |
| 2004/0131025 A1 * | 7/2004 | Dohler et al. | ................ 370/328 |
| 2005/0063336 A1 * | 3/2005 | Kim et al. | .................... 370/329 |

OTHER PUBLICATIONS

J. Jang et al., "Transmit Power Adaptation for Multiuser OFDM Systems," IEEE Journal on Selected Areas in Communications, vol. 21, No. 2, Feb. 2003, pp. 171-178.
R. Knopp, et al. "Information Capacity and Power Control in Single-Cell Multiuser Communications," Proceedings IEEE International Conference Communication, Seattle, WA, Jun. 1995, pp. 331-335.
International Search Report issued for PCT/US2004/043320 dated Mar. 31, 2006.

* cited by examiner

*Primary Examiner*—Raymond S Dean
(74) *Attorney, Agent, or Firm*—Fulbright & Jaworski L.L.P.

(57) ABSTRACT

A method and apparatus for combining signals of multiple users onto a common channel is disclosed. In one embodiment, the method comprises identifying one or more traffic channels that are of one or more predetermined quality levels to a plurality of subscriber units based on channel profiles of the plurality of subscriber units and transmitting phase modulation multiplexed signals to the plurality of subscriber units through a common set of one or more channels having higher quality than the one or more predetermined quality levels.

15 Claims, 4 Drawing Sheets

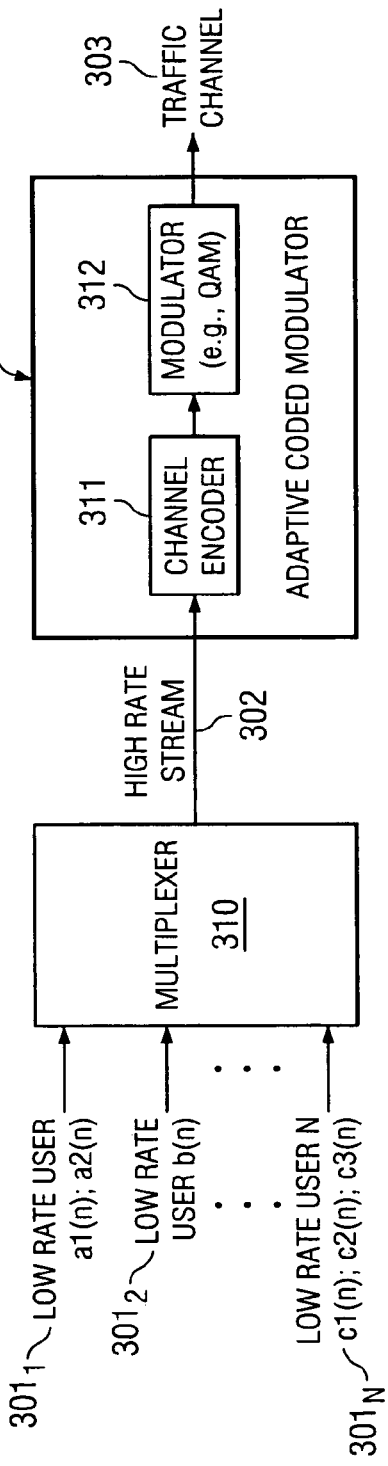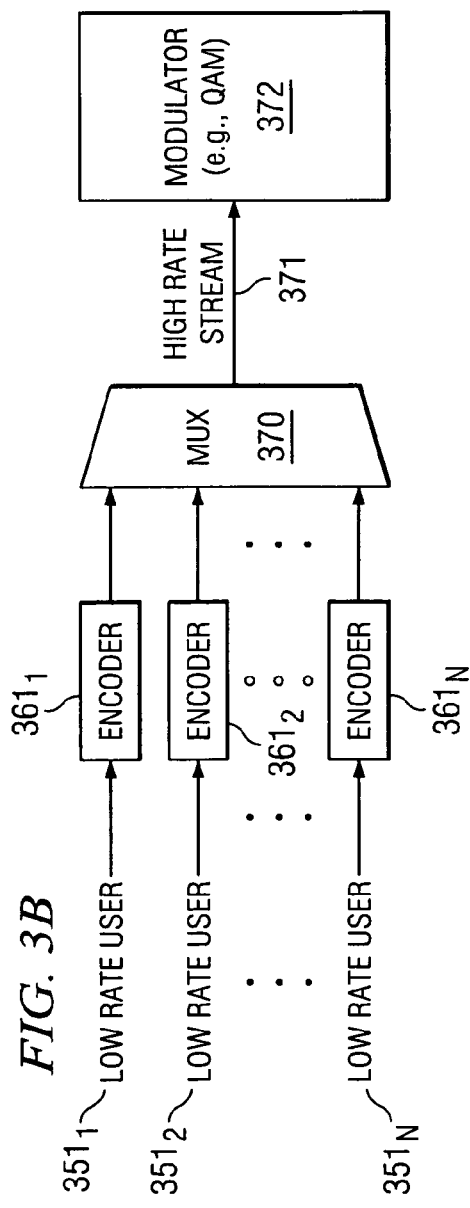

EXPLOITING MULTIUSER DIVERSITY THROUGH PHASE MODULATION MULTIPLEXING

FIELD OF THE INVENTION

The present invention relates to the field of wireless communications; more particularly, the present invention relates to the use of multi-user diversity in orthogonal multiple access wireless communications systems.

BACKGROUND OF THE INVENTION

Modern broadband wireless networks have to support heterogeneous users with a large variation in service requirements. While the peak data rate of most systems increases with the bandwidth, the number of simultaneous users a system can support does not always increase proportionally due to the system granularity issue. TDMA (time-division multiple-access) and CDMA (code-division multiple-access) are known to have limited granularity and thus suffer from decreased spectrum efficiency when the system is heavily loaded. Other performance parameters that may be affected by coarse granularity include packet delays and jittering.

By partitioning the radio resource in both the frequency domain and the time domain, orthogonal frequency-division multiple-access (OFDMA) offers flexibility and granularity over either TDMA or CDMA. Similar to TDMA and synchronous CDMA with orthogonal spreading codes, each traffic channel in OFDMA is exclusively assigned to a single user, eliminating intracell interference in a system. A salient feature of orthogonal multiple access schemes such as OFMDA, TDMA, SCDMA is its capability to explore the so-called multiuser diversity in a wireless network (R. Knopp and P. A. Humblet, "Information capacity and power control in single-cell multiuser communications," in Proc. IEEE Int. Conf. Comm. 1995, Seattle, Wash., June 1995, pp. 331-335).

Adaptive coded modulation (ACM) and dynamic channel allocation (DCA) are well-known in the art. For example, for more information on DCA, see U.S. Pat. No. 6,606,499, "Dynamic channel allocation method in a cellular radio communication network."

When orthogonal multiple access schemes are combined with adaptive coded modulation (ACM) and dynamic channel allocation (DCA), the spectrum efficiency of these approaches their theoretic bounds. As a matter of fact, it can be proved that in terms of total system capacity, OFDMA is indeed optimal in broadband downlink transmission. For more information, see Jiho Jang and Kwang Bok Lee, "Transmit power adaptation for multiuser OFDM systems," IEEE Journal on Selected Areas in Communication, vol. 21, no. 2, February 2003.

On the other hand, the benefits of ACM and DCA cannot be fully captured without taking into account the actual traffic patterns of the users. For a system with many low and constant-rate users (e.g., voice), the need for individual user based ACM vanishes. High-qualify traffic channels are sometimes wasted, especially in downlink transmission where power control is less feasible. Consider a situation involving a number of voice users with QPSK+½ coding as the default coding and modulation scheme. If only one user is allowed in each traffic channel, the maximum throughput of each traffic channel is fixed as 1 bit/s/Hz, regardless of the traffic channel condition. Note that the problem cannot be solved by buffering (and burst transmission) due to the delay constraints in voice communications.

SUMMARY OF THE INVENTION

A method and apparatus for combining signals of multiple users onto a common channel is disclosed. In one embodiment, the method comprises identifying one or more traffic channels that are of one or more predetermined quality levels to a plurality of subscriber units based on channel profiles of the plurality of subscriber units and transmitting phase modulation multiplexed signals to the plurality of subscriber units through a common set of one or more channels having higher quality than the one or more predetermined quality levels.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 3A is a block diagram of one embodiment of a phase modulation multiplexer that multiplexes data from multiple low rate users into a high rate stream for high-dimensional coded modulation.

FIG. 3B illustrates another embodiment of phase modulation multiplexing logic.

DETAILED DESCRIPTION OF THE PRESENT INVENTION

Figure 1:
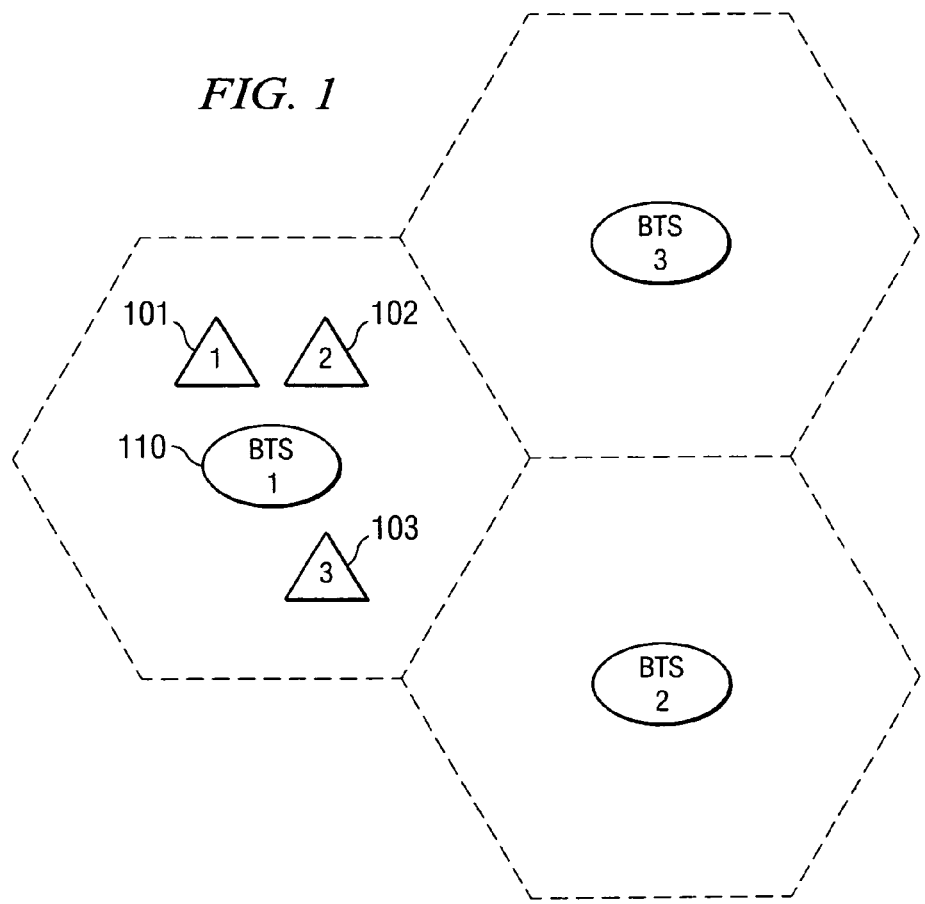
FIG. 1 illustrates a wireless networks where users' channel conditions are vastly different, due to different propagation losses, interference patterns, and multipath reflections.

A method and apparatus for exploiting multiuser diversity in orthogonal multiplexing/multiple access (e.g., OFDMA, TDMA, SCDMA) wireless broadband networks are described. In one embodiment, data for two or more low rate subscriber units are combined (e.g., multiplexed) into one (or more) high quality channels. The channels that are being combined for low rate subscriber units may be voice channels. In one embodiment, the high quality channels are identified based on channel profiles and periodic traffic pattern analysis of the channels used by the group of subscriber units. The data for multiple subscriber units is combined into a single channel in order to use the single channel more fully or, potentially, at full capacity.

In one embodiment, an intelligent traffic allocation scheme enables sharing of high-quality orthogonal traffic channel(s) through PMM-based dynamic data aggregation. In one embodiment, the PMM is performed according to U.S. Pat. No. 6,295,273 entitled, "Phase modulation multiplexing transmission unit and phase modulation multiplexing method," issued Sep. 25, 2001. Using phase modulation multiplexing (PMM) takes advantage of the common set of high-quality traffic channels associated with multiple low rate subscribers. This increases the system granularity, and more importantly, guarantees increased, and potentially maximum, usage of high-quality traffic channels irrespective of the traffic loads of individual users. As a result, the highest achievable rate can be reached on each traffic channel. Note that this approach is distinct from the orthogonal multiplexing/multiple access schemes in prior art where each traffic channel is assigned to only one user.

A method and apparatus that combines phase modulation multiplexing (PMM) with DCA and ACM is described. The techniques set forth herein increase the granularity of a broadband network and at the same time, increases, and potentially maximizes, the system spectrum efficiency under stringent QoS constraints (e.g., rate, delay, and jitter).

The techniques capture the multiuser diversity not available in existing systems with a large number of constant-rate users. Note there is no prior art that discloses the dynamic aggregation using phase modulation multiplexing based on the users' channel and traffic characteristics. In one embodiment, no additional hardware is required at the base station. In addition, it also overcomes the drawbacks in prior art that employs bursty transmission—no delays and jittering are created to low rate traffics.

The new technique can be utilized in wireless communications systems employing a variety of multiple-access schemes such as, for example, OFDMA, TDMA, FDMA, CDMA, SDMA, and any combinations of these multiple-access schemes.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

FIG. 1 illustrates a typical wireless network where subscriber units 101-103 are geometrically spread in a cell, leading to different channel characteristics between the base-station 110 and subscriber units 101-103. Note that for the purposes herein, the terms "subscriber" and "subscriber unit" are used interchangeably with the term "user." In this particular example, two users (subscribers 101 and 102) are closer to base-station 110 while the other user (subscriber 103) is farther away than subscriber 101 and 102. The distance between a subscriber and base-station 110, coupled with other factors such as multipath reflections, the interference and shadowing effects, determines the signal-to-interference-and-noise-ration (SINR) received at each subscriber unit during downlink operation. Depending on the adaptive coded modulation (ACM) scheme employed, the SINR value dictates the achievable data rate at a given traffic channel. Assuming the downlink transmission power on individual traffic channels is fixed, the overall system capacity (or spectrum efficiency) can be increased if increased, or potentially maximum, throughput can be delivered over each traffic channel using adaptive coded modulation.

In FIG. 1, if both subscriber 101 and subscriber 102 are low, fixed-rate voice users and the typical data rate of voice communications is 8 kbps or lower, then to accommodate this type of traffic, only low dimensional modulation (e.g., QPSK+½ coding→1 bit/s/Hz) is needed, regardless of the actual channel SINR value. As a result, high-quality channels suitable for higher dimensional modulations (e.g., 64QAM+⅚ coding→5 bit/s/Hz) will be under-used, leading to a waste of spectrum resources. This problem is particularly evident in orthogonal multiplexing/multiple-access schemes such as TDMA, OFDMA, and synchronous CDMA (SCDMA) with one user in each traffic channel (a time slot, a cluster of sub-carriers, or an orthogonal spreading code). According to one embodiment of the present invention, the aforementioned problem is solved by combining dynamic channel allocation (DCA), adaptive coded modulation (ACM), and phase modulation multiplexing (PMM).

Figure 2:
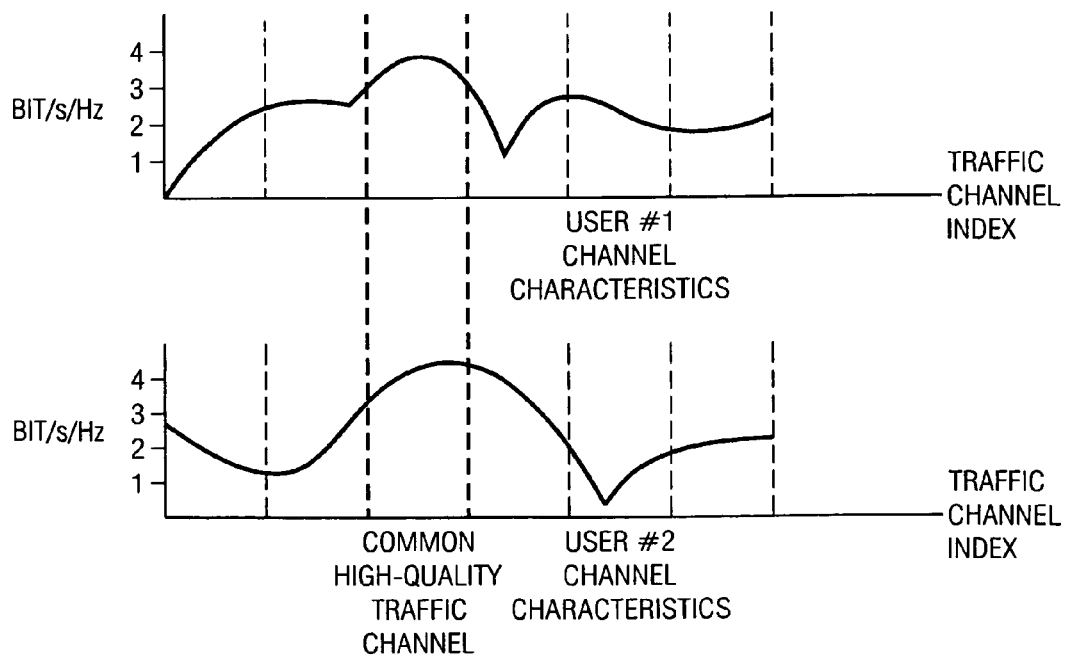
FIG. 2 depicts channel profiles of two users and the achievable rates in each traffic channels.

FIG. 2 illustrates a dynamic channel allocation technique in combination of PMM for multiple subscriber units sharing a common set of high-quality traffic channels. Referring to FIG. 2, the channel characteristics of two low rate users with basic rate requirement<2 bit/s/Hz are illustrated with some high-quality traffic channels are common to both users. The y-axis shows the achievable data rate (e.g., the ACM rate based on the SINR value) in bit/s/Hz. As shown, both users favor traffic channel #3 where the achievable rate is ~4 bit/s/Hz. In this case, channel allocation logic is one embodiment of the present invention assigns the same traffic channel to both subscriber units using PMM. By aggregating the traffic loads of both subscriber units, the traffic channel is utilized with increased, and potentially full, capacity, resulting in much higher system spectrum efficiency.

FIG. 3A is a block diagram of one embodiment of phase modulation multiplexing logic to aggregate two or more low rate users using a PMM scheme. Referring to FIG. 3A, subscriber units $301_{1-N}$ are multiplexed into a high-rate stream 302 using multiplexer 310. In one embodiment, subscriber units $301_{1-N}$ have rates of 2-bit/unit time, 1-bit/unit time, and 3-bit/unit time, respectively, while high-rate data stream has a rate of 6-bit/unit time.

An adaptive coded modulator 320 receives high-rate stream 302. In one embodiment, adaptive coded modulator 320 comprises a channel encoder 311 and a modulator 312 (e.g., QAM). Channel encoder 311 performs channel coding 311 on data in high-rate steam 302 to produce channel coded data. Channel encoder 311 may comprise a convolutional coder, an LDPC coder, a Turbo coder, a TPC coder, a block coder and/or a trellis coder. Modulator 312 receives and modulates the channel coded data. In one embodiment, modulator 312 modulates the channel coded data using QAM, which maps the channel coded data onto a QAM constellation. Adaptive coded modulator 320 then loads the resulting coded and modulated signals onto a traffic channel 303.

FIG. 3B illustrates another embodiment of a phase modulation multiplexing logic. Referring to FIG. 3B, low-rate data streams from different subscribers $351_{1-N}$ are first encoded separately using the same or different encoders $361_{1-N}$ to generate encoded data streams. The encoding may be performed using, for example, a convolutional encoder. Multiplexer 370 multiplexes the encoded streams into a high-rate stream 371, which is then modulated using modulator 372. In one embodiment, modulator 372 maps high-rate data stream 371 onto a QAM constellation.

In yet another embodiment, modulator 372 maps high-rate data stream 371 onto a hierarchical QAM constellation to allow different detection thresholds at the user ends. This may be accomplished using the technique disclosed in U.S. Pat. No. 5,966,412, "Apparatus and Method for Processing a Quadrature Amplitude Modulated (QAM) Signal," issued Oct. 12, 1999.

In yet another embodiment, other orthogonal phase modulation multiplexing schemes such as, for example, the orthogonal waveform modulation are used to multiplex the low rate data streams from different users.

Figure 4:
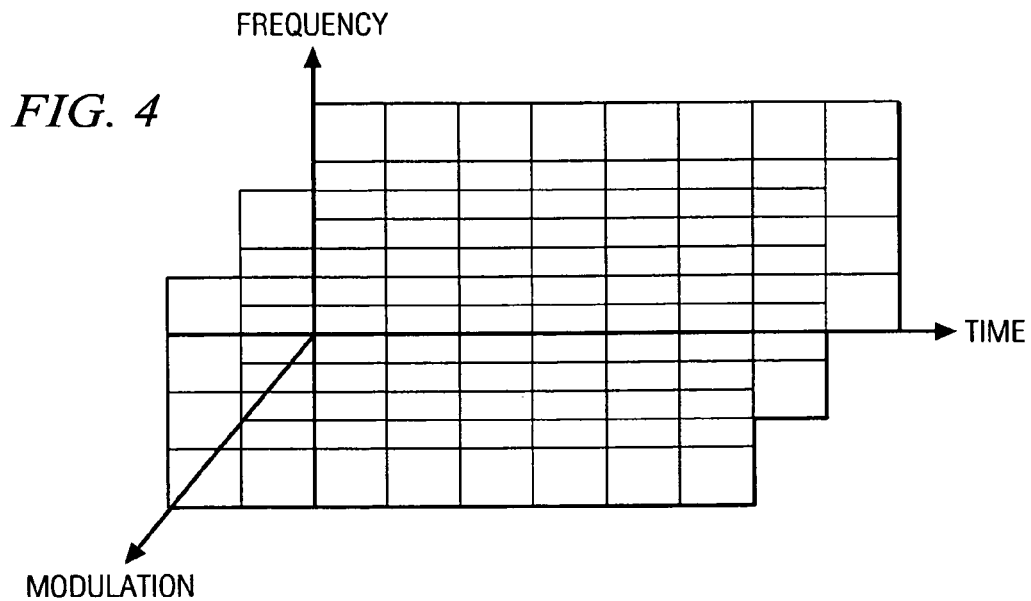
FIG. 4 illustrates increasing the granularity of a wireless system with phase modulation multiplexing.

FIG. 4 illustrates the use of PPM to improve the granularity of an orthogonal multiplexing/multiple access scheme. The added dimension in phase modulation enables simultaneous transmission of data intended for multiple users without causing interference.

Figure 5:
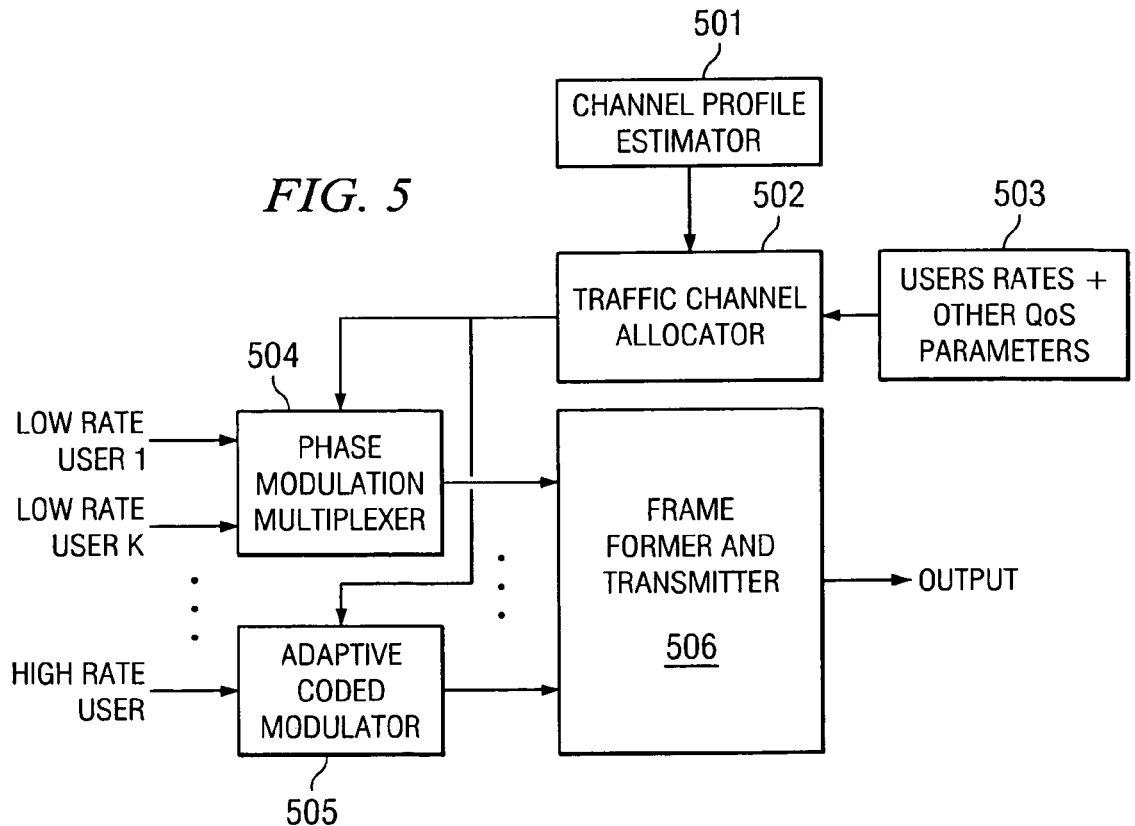
FIG. 5 is a block diagram of one embodiment of a dynamic channel multiplexing logic unit that utilizes DCA, ACM, and PMM.

FIG. 5 is a block diagram of one embodiment of dynamic channel multiplexing logic at a base-station. Referring to FIG. 5, a channel profile estimator 501 estimates the channel characteristics (time, frequency, and spatial responses) of users. The channel characteristics may be based on either users' feedback, uplink channel estimation, or both. In response to this input, channel profile estimator 501 generates a profile for each channel in a manner well-known in the art.

Traffic channel allocator 502 receives the channel profiles. Traffic channel allocator 502 also receives user data rate information and optionally other QoS parameters, such as, for example, delay and bit-error-rate requirements. In response to these inputs, traffic channel allocator 502 makes traffic channel allocation decisions for users. Traffic channel allocator 502 signals phase modulation multiplexer 504 to cause the low-rate users to be phase modulation multiplexed onto a common set of one or more traffic channels. Traffic channel allocator 502 also controls adaptive coded modulator 505 with respect to a high-rate user.

After all traffic channels are loaded from phase modulation modulator 504 and adaptive coded modulator 505, a frame former and transmitter 506 consolidates the modulated signals from all traffic channels into data frames (e.g., TDMA, OFDMA, SCDMA, SDMA) and performs data transmission.

In one embodiment, the dynamic channel multiplexing logic in FIG. 5 updates the channel allocation and ACM schemes periodically based on a fixed or a variable time interval.

Figure 6:
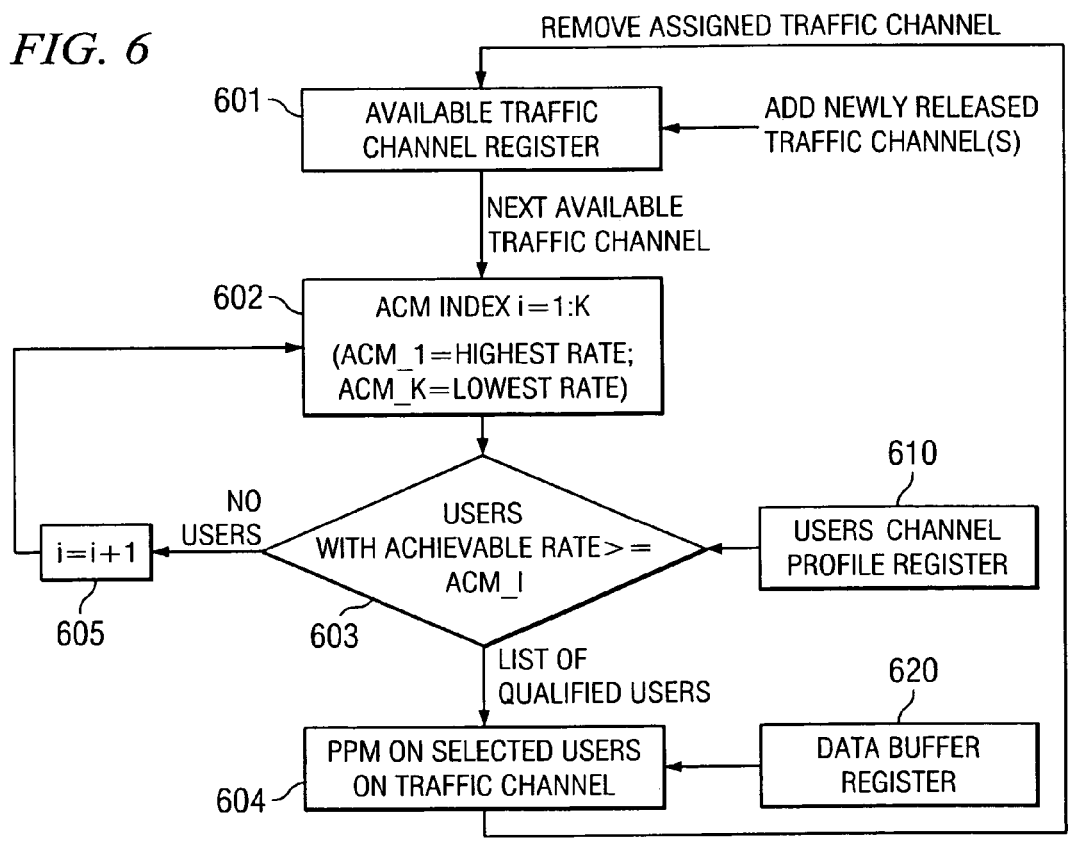
FIG. 6 is a flow diagram of one embodiment of a process for performing dynamic channel multiplexing.

Several channel allocation and phase modulation multiplexing criteria can be considered. FIG. 6 is a flow diagram of one embodiment of a process for selecting traffic channels. The process is performed by processing logic that may comprise hardware (circuitry, dedicated logic, etc.), software (such as is run on a general purpose computer system or a dedicated machine), or a combination of both.

Referring to FIG. 6, processing logic stores a list of unallocated traffic channels in an available traffic channel register (processing block 601). In one embodiment, processing logic constantly updates the list in the traffic channel register every time a traffic channel is assigned or released.

Processing logic evaluates each available traffic channel at different achievable rates, starting at the highest: ACM_1, to the lowest: ACM_K. To that end, processing logic sets the channel at the highest rate (processing block 602) and then tests whether the achievable rate of the users is greater than or equal to the rate being tested (processing block 603). In one embodiment, a users' channel profile register 610 provides the latest channel characteristics of the users. If one or more users are qualified at ACM_1, processing logic selects the traffic channel and updates the available channel register to move the assigned traffic channel. Otherwise, processing logic updates the index (processing block 605) and repeats the process by reducing the rate to ACM_2, ACM_3, . . . , ACM_K, until the number of qualified users becomes non-zero.

In one embodiment, from the list the qualified users, processing logic selects a subset or all of users from a list of qualified users based on their associated traffic information (e.g., data rate, delay, buffered data, other QoS parameters, etc.) stored in a data buffer register 620 in the, or accessible by the base station (processing block 604). Thus, PPM is performed to multiplex the selected users' data steams onto the traffic channel being evaluated.

When the subscriber unit receives the combined high rate stream, they demodulate and decode the modulated and channel encoded high rate stream to obtain the data that is designated for them. In an alternate embodiment, instead of demodulating and decoding the entire modulated and channel encoded high rate stream, each subscriber unit only demodulates and decodes its designated portion thereof. Note that identifying a portion of the stream designated for a particular subscriber unit is well-known in the art.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A base station for a wireless communication system, the base station comprising:
   a channel profile estimator to generate channel profiles;
   a traffic channel allocation logic to perform channel allocation in response to the channel profiles and subscriber data rate information;
   one or more phase modulation multiplexers responsive to an output from the traffic channel allocation logic to multiplex data for a plurality of subscriber units;
   one or more adaptive coded modulators responsive to an output form the traffic channel allocation logic to apply ACM to data for one or more subscriber units; and
   a frame former and a transmitter to combine modulated signals from the one or more phase modulation multiplexers and the one or more adaptive coded modulators into data frames and transmit the data frames.

2. The base station defined in claim 1 wherein the traffic channel allocation logic assigns traffic channels for users based on channel profiles of the users.

3. The base station defined in claim 2 wherein the traffic channel allocation logic selects a group of low rate subscriber units and causes data for the group to be phase modulation multiplexed onto a common traffic channel.

4. The base station defined in claim 3 wherein the traffic channel allocation logic selects a group of low rate subscriber units based on traffic conditions of subscriber units.

5. The base station defined in claim 4 wherein traffic conditions of users comprises data rate requirements of the subscriber units.

6. The base station defined in claim 4 wherein traffic conditions of users comprises delay constraints of the subscriber units.

7. The base station defined in claim 4 wherein traffic conditions of users comprises jitter constraints of the subscriber units.

8. The base station defined in 3 wherein the traffic channel allocation logic selects a group of low rate subscriber units based on one or more channel conditions of the subscriber units.

9. The base station defined in 8 wherein the one or more channel conditions of the subscriber units comprises the SINR of each of the subscriber units.

10. The base station defined in 8 wherein the one or more channel conditions of the subscriber units comprise the achievable data rate of each of the subscriber units using ACM.

11. The base station defined in 1 wherein the channel profile estimator generates the plurality of channel profiles based on estimates one or more channel characteristics of users.

12. The base station defined in 1 wherein the channel profile estimator estimates the one or more channel characteristics based on subscriber unit feedback.

13. The base station defined in 1 wherein the channel profile estimator estimates the one or more channel characteristics base on uplink channel estimations.

14. The base station defined in 1 wherein the traffic channel allocation logic performs channel allocation in response to one or more QoS parameters.

15. The base station defined in claim 1 wherein the traffic channel allocation logic updates traffic channel allocation and a list of subscriber units being phase modulation multiplexed periodically.

* * * * *